(12) United States Patent
Carthew et al.

(10) Patent No.: US 12,455,564 B2
(45) Date of Patent: Oct. 28, 2025

(54) VEHICLE DATA SHARING FOR COORDINATED ROBOT ACTIONS

(71) Applicant: Ford Global Technologies, LLC, Dearborn, MI (US)

(72) Inventors: James Carthew, Ann Arbor, MI (US); Nelson Alexander Brock, Sebastopol, CA (US); Jeffrey Yizhou Hu, Ann Arbor, MI (US)

( * ) Notice: Subject to any disclaimer, the term of this patent is extended or adjusted under 35 U.S.C. 154(b) by 336 days.

(21) Appl. No.: 18/066,711

(22) Filed: Dec. 15, 2022

(65) Prior Publication Data

US 2024/0201683 A1 Jun. 20, 2024

(51) Int. Cl.
*G08G 5/57* (2025.01)
*B64C 39/02* (2023.01)
(Continued)

(52) U.S. Cl.
CPC ......... *G05D 1/0016* (2013.01); *B64C 39/024* (2013.01); *B64U 20/87* (2023.01);
(Continued)

(58) Field of Classification Search
CPC ........ G05D 1/0016; G05D 1/101; G05D 1/12; G05D 1/104; G05D 1/0022; G05D 1/0027;
(Continued)

(56) References Cited

U.S. PATENT DOCUMENTS 10,025,315 B2 7/2018 Klinger et al.
10,585,439 B2 3/2020 Buttolo et al.
(Continued)

FOREIGN PATENT DOCUMENTS

CN 105825713 A * 8/2016 ............. G08G 1/065
CN 110799385 A 2/2020
(Continued)

OTHER PUBLICATIONS

Liam Paull et al., Towards an Ontology for Autonomous Robots, IEEE/RSJ International Conference on Intelligent Robots and Systems, Oct. 7-12, 2012.
(Continued)

*Primary Examiner* — Rachid Bendidi
*Assistant Examiner* — Irene C Khuu
(74) *Attorney, Agent, or Firm* — Emily Drake; Eversheds Sutherland (US) LLP

(57) ABSTRACT

A vehicle integrated unmanned aerial system is disclosed. The system may include a vehicle and an unmanned aerial vehicle (UAV). The vehicle may include a vehicle processor configured to obtain a vehicle telemetry information from a vehicle telemetry unit and a user input from a vehicle user. Further, the vehicle may include a transmitter that may be configured to transmit the vehicle telemetry information and the user input to the UAV. The UAV may include a UAV receiver configured to receive the vehicle telemetry information and the user input. Further, the UAV may include a UAV processor that may be configured to obtain the vehicle telemetry information and the vehicle user from the UAV receiver and predict a vehicle movement based on the vehicle telemetry information. The UAV processor may be further configured to maneuver the UAV based on the predicted vehicle movement and the user input.

16 Claims, 4 Drawing Sheets

(51) Int. Cl.
*B64U 20/87* (2023.01)
*B64U 70/00* (2023.01)
*G05D 1/00* (2006.01)
*B64U 101/20* (2023.01)
*B64U 101/30* (2023.01)

(52) U.S. Cl.
CPC ............. *B64U 70/00* (2023.01); *G05D 1/101* (2013.01); *G05D 1/12* (2013.01); *B64U 2101/20* (2023.01); *B64U 2101/30* (2023.01)

(58) Field of Classification Search
CPC .. G05D 1/0094; G05D 1/0011; G05D 1/0038; G05D 1/0808; G05D 1/226; G05D 1/2295; G05D 2109/254; G05D 1/2246; G05D 1/2247; G05D 1/2465; G05D 1/689; G05D 1/695; G05D 2103/00; G05D 2105/87; G05D 2107/13; B64C 39/024; B64C 25/34; B64C 2203/00; B64C 2211/00; B64C 27/08; B64C 27/12; B64C 39/02; B64U 20/87; B64U 70/00; B64U 2101/20; B64U 2101/30; B64U 2201/20; B64U 10/14; B64U 50/19; B64U 2201/10; B64U 10/10; B64U 2101/64; B64U 20/80; B64U 30/20; B64U 2101/35; B64U 2101/40; B64U 50/30; B64U 10/13; B64U 2101/00; B64U 50/13; B64U 50/31; B64U 50/32; B64U 50/34; B64U 60/50; B64U 10/25; B64U 10/70; B64U 20/40; B64U 20/50; B64U 2201/00; B64U 2201/104; B64U 80/82; B64U 80/86; A23B 40/00; G08G 1/0108; H04W 4/40; H04W 4/44; H04W 12/08; H04W 24/04; H04W 4/021; H04W 76/10; H04W 76/27; H04W 84/18; H04W 12/06; H04W 4/022; H04W 4/80; H04W 72/21; H04W 8/18; H04W 84/005; H04W 84/042; H04W 12/041; H04W 12/12; H04W 12/37; H04W 16/26; H04W 28/18; H04W 4/00; H04W 4/02; H04W 40/248; H04W 52/0206; H04W 64/00; H04W 72/04; H10D 84/0126; H10H 29/922; H04L 67/12; H04L 12/2803; H04L 12/2816; H04L 41/28; H04L 67/125; H04L 63/0823; H04L 63/083; H04L 63/0892; H04L 63/101; H04L 65/1069; H04L 65/403; H04L 67/34; H04B 7/18506; H04B 10/1129; H04B 17/318; H04B 7/155; H04B 10/11; H04B 7/185; H04B 7/18504; B64D 47/08; G08B 25/10; G08B 13/1965; G08B 25/008; G08C 17/02; G08C 2201/42; H04N 23/661; H04N 23/69; H04N 23/695; H04N 7/22; H04N 21/214; H04N 21/2146; H04N 21/23418; H04N 21/25841; H04N 21/2668; H04N 21/41422; H04N 21/44218; H04N 21/482; H04N 7/147; H04N 7/15; H04N 7/18; H04N 7/185
See application file for complete search history.

(56) References Cited

U.S. PATENT DOCUMENTS

| | | | |
|---|---|---|---|
| 2009/0157233 A1* | 6/2009 | Kokkeby | G01S 3/7864 701/3 |
| 2010/0042269 A1* | 2/2010 | Kokkeby | G05D 1/0094 701/3 |
| 2013/0293395 A1* | 11/2013 | Ohama | G08G 1/166 340/904 |
| 2015/0353206 A1* | 12/2015 | Wang | B64U 70/93 244/114 R |
| 2016/0196525 A1* | 7/2016 | Kantor | G08G 5/0069 705/330 |
| 2017/0102467 A1* | 4/2017 | Nielsen | G01S 19/47 |
| 2017/0220041 A1* | 8/2017 | Tanaka | H04W 4/40 |
| 2017/0229029 A1* | 8/2017 | Klinger | G06V 20/176 |
| 2017/0371353 A1* | 12/2017 | Millinger, III | H04W 4/023 |
| 2018/0074520 A1* | 3/2018 | Liu | G08G 5/21 |
| 2018/0086455 A1* | 3/2018 | Burch, V | G06Q 10/0833 |
| 2018/0129212 A1* | 5/2018 | Lee | G06F 3/017 |
| 2018/0137454 A1* | 5/2018 | Kulkarni | G08G 5/56 |
| 2018/0233007 A1* | 8/2018 | Williams | A61K 31/55 |
| 2019/0051046 A1* | 2/2019 | Jin | G08G 1/091 |
| 2019/0064836 A1* | 2/2019 | Buttolo | G06T 7/70 |
| 2019/0138011 A1* | 5/2019 | Bloeckner | G05D 1/0094 |
| 2019/0295428 A1* | 9/2019 | Holmgren | B64U 10/14 |
| 2019/0308745 A1* | 10/2019 | Ki | B64D 45/00 |
| 2019/0392716 A1* | 12/2019 | Lu | G05D 1/101 |
| 2020/0130510 A1* | 4/2020 | Eck | B60L 53/51 |
| 2020/0130829 A1* | 4/2020 | Gandiga | G05D 1/0061 |
| 2020/0389387 A1* | 12/2020 | Magzimof | H04L 45/16 |
| 2021/0116942 A1* | 4/2021 | Gandiga | B64U 50/30 |
| 2021/0221434 A1* | 7/2021 | Liu | B60W 60/0015 |
| 2021/0294931 A1* | 9/2021 | Tamazato | G06F 30/13 |
| 2022/0185472 A1* | 6/2022 | Hirai | H04N 7/18 |

FOREIGN PATENT DOCUMENTS

| | | | |
|---|---|---|---|
| CN | 111103893 A | 5/2020 | |
| CN | 212135229 U | 12/2020 | |
| CN | 112896193 A * | 6/2021 | ............ B60W 50/00 |

OTHER PUBLICATIONS

Joao Ramos et al., Distributed Architecture for Unmanned Vehicles Services, Sensors 2021, 21, 1477, Jan. 13, 2021, 2-33.

\* cited by examiner

VEHICLE DATA SHARING FOR COORDINATED ROBOT ACTIONS

BACKGROUND

Unmanned aerial vehicles or UAVs (e.g., drones or robots) have applications in various industries, such as transportation, e-commerce, agriculture, entertainment, security and the like. The utility of drones is expected to grow further and expand beyond conventional industries as UAV technology progresses.

One growing area of drone application is in the automotive industry, specifically related to capturing images/videos of moving vehicles by using drones with in-built cameras. For such applications, the vehicle and the drone may need to perform a collaborative action to ensure coordination between vehicle and drone movements.

There exist various conventional approaches to facilitate coordination between vehicle and drone movements. One such conventional approach includes the use of a handheld controller managed by a UAV pilot, who may control the drone movement based on the vehicle movement. This approach typically includes a vehicle driver and a UAV pilot, which results in manual intervention to control the drove movement. Further, this approach may be prone to human error.

Another conventional approach includes the use of a Ground Control Station (GCS) that may be located in the vehicle and configured to send movement control signals to the drone. This approach requires installation of additional hardware units or sensors in the vehicle, and hence may increase vehicle weight and complexity.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a vehicle integrated unmanned aerial system. The system may include a vehicle and an unmanned aerial vehicle (UAV). The UAV may be a drone with an in-built camera. The drone may be configured to follow the vehicle's movements and capture vehicle images/videos. In some aspects, the vehicle may receive user inputs or preferences associated with drone movement from a vehicle user and transmit the user inputs to the drone. The drone may follow the vehicle's movements based on the user inputs. Further, the vehicle may transmit vehicle data to the drone, which may enable the drone to predict vehicle movement. For example, the vehicle may transmit a vehicle transmission status, vehicle gas pedal and brake pedal positions, a vehicle steering wheel angle and/or the like to the drone, and the drone may predict the vehicle's movement based on the received vehicle data. The drone may maneuver the drone's movement based on the vehicle's predicted movement and the user inputs or preferences.

In some aspects, the drone may be configured to store the captured vehicle images/videos in a drone memory. Further, the drone may be configured to transmit the images/videos to a user device or the vehicle. In additional aspects, the vehicle may be configured to store the images/videos in a vehicle memory and/or display the images/videos on a vehicle infotainment system.

The present disclosure discloses a system that facilitates coordination between vehicle and drone movements. The system uses existing vehicle and drone units to maneuver drone movement, and does not require installation of separate sensors. Further, the system uses vehicle data to coordinate vehicle and drone movements and does not require manual intervention.

Illustrative Embodiments

The disclosure will be described more fully hereinafter with reference to the accompanying drawings, in which example embodiments of the disclosure are shown, and not intended to be limiting.

Figure 1:
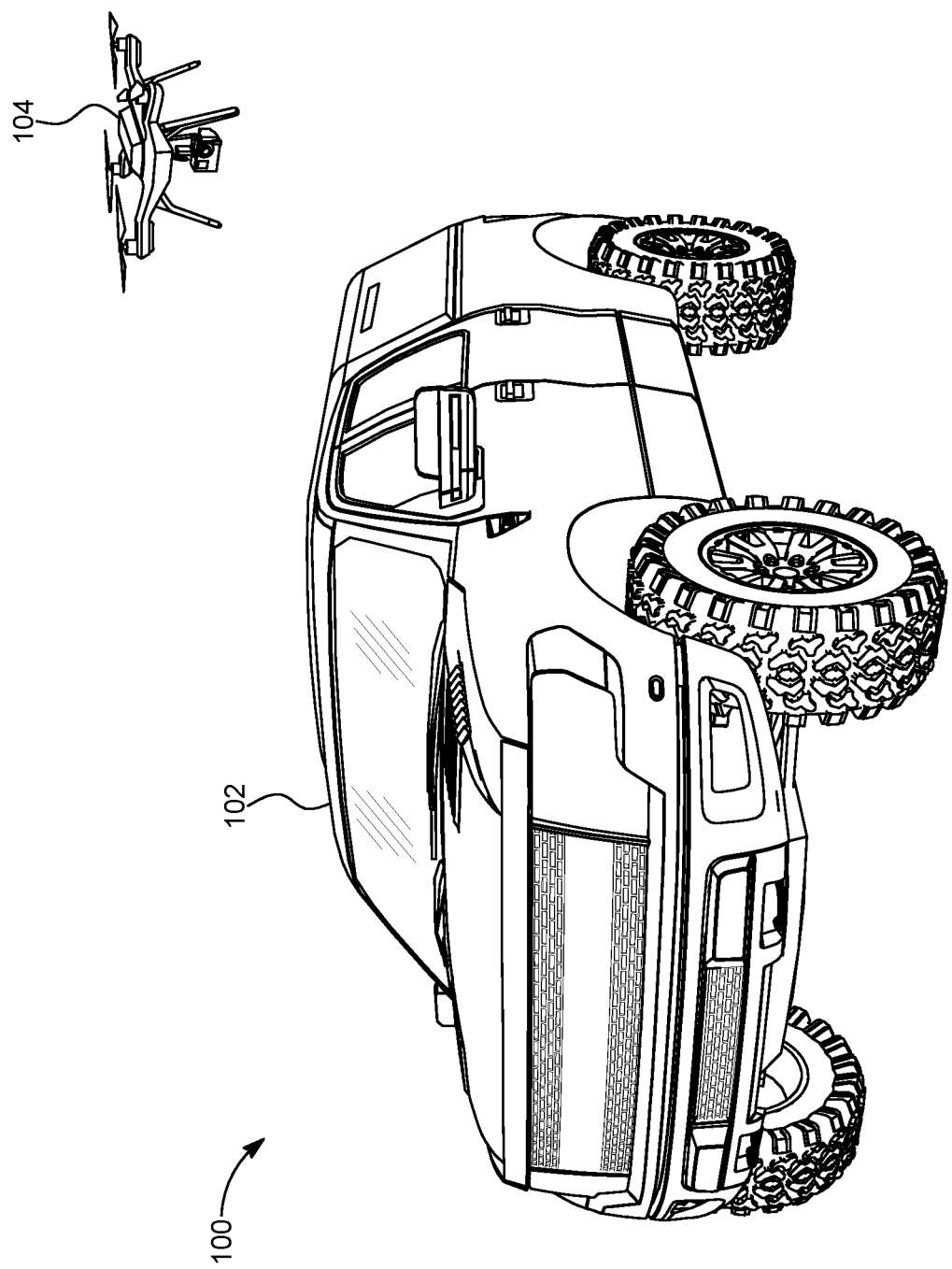
FIG. 1 depicts an example system in which techniques and structures for providing the systems and methods disclosed herein may be implemented.

FIG. 1 depicts an example system 100 in which techniques and structures for providing the systems and methods disclosed herein may be implemented. More particularly, FIG. 1 depicts the system 100 that may include a vehicle 102. The vehicle 102 may take the form of any passenger or commercial vehicle such as, for example, an off-road vehicle, a car, a crossover vehicle, a van, a minivan, a bus, a truck, etc. Further, the vehicle 102 may be a manually driven vehicle and/or may be configured to operate in partially or fully autonomous mode. Furthermore, the vehicle 102 may include any powertrain such as, for example, a gasoline engine, one or more electrically-actuated motor(s), a hybrid system, etc.

The system 100 may further include an unmanned aerial vehicle (UAV) 104 (e.g., a drone 104). In some aspects, the drone 104 may include a camera (not shown) that may be configured to capture vehicle images/videos or images of vehicle's surroundings. The drone 104 may capture vehicle images/videos for vehicle inspection or cinematography. Specifically, during drone operation, the drone 104 may be configured to follow vehicle movement through air and/or land, and capture vehicle's images or videos. In other words, the drone 104 may be configured to perform aerial and/or ground movement while following vehicle movement and capture vehicle's images or videos while the vehicle 102 is in motion. In some aspects, the drone 104 may be further configured to transmit the captured images/videos real-time to the vehicle 102.

In some aspects, the drone 104 may be housed in the vehicle 102 when the drone 104 is not in operation. Specifically, the vehicle 102 may include a housing (not shown) for the drone 104. In some aspects, the housing may be present near a vehicle sunroof area (e.g., on a vehicle top or ceiling area) and may include a landing pad. The landing pad may have a printed quick response (QR) code. In some aspects, the drone 104 may be configured to locate the QR code while the drone 104 is in operation (e.g., while performing aerial operation) and land on the QR code, which may enable precise drone landing on the vehicle 102.

In further aspects, the vehicle 102 may be configured to control a drone launch operation. Specifically, a vehicle user may transmit a request (e.g., UAV launch instructions) to the vehicle 102 to launch the drone 104 and the vehicle 102 may be configured to launch the drone 104 based on user's request. In an exemplary aspect, the vehicle user may transmit the request for drone launch when the user intends the drone 104 to capture the vehicle's images/videos. Further, in addition to the drone launch request, the user may transmit user inputs associated with drone's flight to the vehicle 102. The user inputs may include, for example, instructions for a specific position(s), with respect to the vehicle 102, where the drone 104 may fly and capture the vehicle's images or videos. Additionally, the user inputs may include specific user preferences for capturing the vehicle's image or videos. In some aspects, the user may transmit the drone launch request and/or the user inputs via a vehicle infotainment system or a user device paired with the vehicle 102.

Responsive to receiving the drone launch request, the vehicle 102 may determine whether drone launch conditions are met. For example, the vehicle 102 may determine whether the vehicle 102 is in a location where UAV flight may be restricted, when the vehicle 102 receives the drone launch request. In some aspects, the vehicle 102 may determine whether the vehicle 102 may be in a UAV flight restricted area by using a vehicle's Global Positioning System (GPS) location. Responsive to determining that the vehicle is in the UAV flight restricted area, the vehicle 102 may inform the user that the vehicle 102 may not launch the drone 104 (e.g., till the vehicle 102 moves out of the UAV flight restricted area). Alternative, the vehicle 102 may launch the drone 104 when the vehicle 102 determines that the vehicle 102 is not in the UAV flight restricted area. In further aspects, the vehicle 102 may determine vehicle transmission status. In particular, the vehicle 102 may determine whether the vehicle 102 is stationary or in motion. Responsive to determining that the vehicle 102 is in motion, the vehicle 102 may not launch the drone 104. Alternatively, the vehicle 102 may launch the drone 104 when the vehicle 102 determines that the vehicle 102 is stationary.

The vehicle 102 may provide take-off or drone launch instructions to the drone 104 when the drone launch conditions are met, which may enable the drone 104 to launch from the housing. In some aspects, the drone launch instructions may include the user inputs associated with the drone's flight. For example, the vehicle 102 may instruct the drone 104 to fly in proximity of a vehicle right rear edge when the drone 104 is aerial and capture the vehicle's images/videos. Alternatively, the vehicle 102 may instruct the drone 104 to fly around the vehicle 102 and capture vehicle's 360-degree view.

In additional aspects, the vehicle 102 may be configured to transmit vehicle data (e.g., vehicle telemetry information) and additional user inputs to the drone 104, while the drone 104 is in operation. The drone 104 may control drone movement based on the vehicle data and the user inputs. For example, the drone 104 may modify drone speed or heading according to vehicle's speed or heading, identified from the vehicle data. The details of the vehicle data and the user inputs may be understood in conjunction with FIG. 2.

The vehicle 102 may be further configured to transmit landing instructions to the drone 104. In some aspects, the vehicle 102 may transmit the landing instructions to the drone 104 in response to receiving a drone-landing request/indication (e.g., UAV retract instructions) from the user or when the vehicle 102 enters the UAV flight restricted area. Responsive to receiving the landing instructions from the vehicle 102, the drone 104 may be configured to land on the housing located in the vehicle 102.

Figure 2:
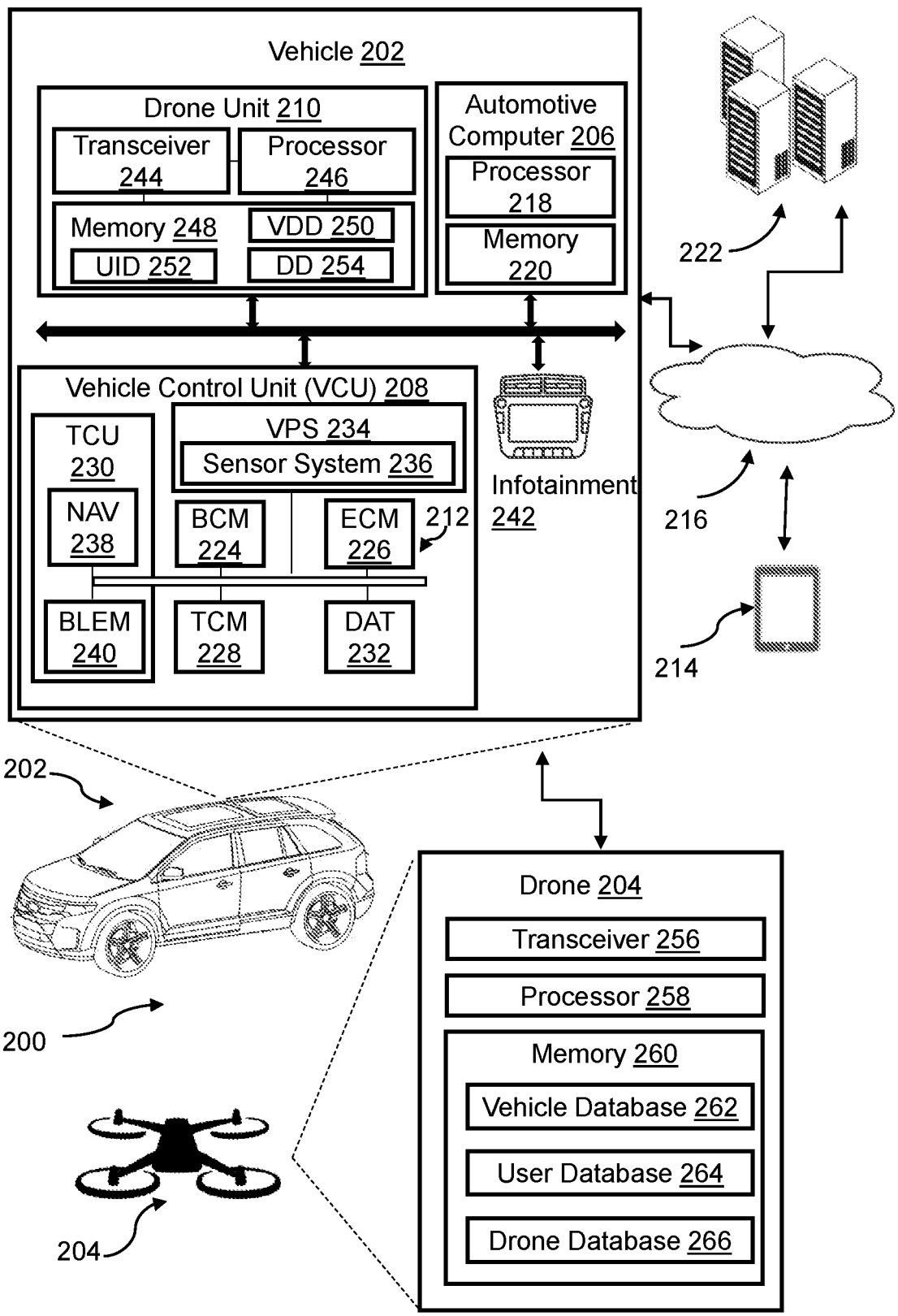
FIG. 2 depicts an example system to facilitate coordination between vehicle and drone movements in accordance with the present disclosure.

FIG. 2 depicts an example system 200 to facilitate coordination between vehicle and drone movements, in accordance with the present disclosure. While explaining FIG. 2, references may be made to FIGS. 1 and 3.

The system 200 may include a vehicle 202 and a drone 204. In some aspects, the vehicle 202 may be same as the vehicle 102 and the drone 204 may be same as the drone 104, which may include an in-built camera (not shown) configured to capture vehicle images/videos.

The vehicle 202 may include an automotive computer 206, a Vehicle Control Unit (VCU) 208 and a drone unit 210. The VCU 208 may include a plurality of Electronic Control Units (ECUs) 212 disposed in communication with the automotive computer 206.

The system 200 may further include a mobile device 214 that may connect with the automotive computer 206 and/or the drone unit 210 by using wired and/or wireless communication protocols and transceivers. In some aspects, the mobile device 214 may be associated with a vehicle user/operator (not shown in FIG. 2). In other aspects, the mobile device 214 may be associated with other users (not shown in FIG. 2). The mobile device 214 may communicatively couple with the vehicle 202 via one or more network(s) 216, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques. In further aspects, the mobile device 214 may communicatively couple with the drone 204 via the one or more network(s) 216.

The network(s) 216 illustrates an example communication infrastructure in which the connected devices discussed in various embodiments of this disclosure may communicate. The network(s) 216 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, the automotive computer 206 and/or the drone unit 210 may be installed in a vehicle engine compartment (or elsewhere in the vehicle 202) and operate as a drone unit functional part, in accordance with the disclosure. The automotive computer 206 may be or include an electronic vehicle controller, having one or more processor(s) 218 and a memory 220. Moreover, the drone unit 210 may be separate from the automotive computer 206 (as shown in FIG. 2) or may be integrated as an automotive computer part.

The processor(s) 218 may be disposed in communication with one or more memory devices disposed in communication with the respective computing systems (e.g., the memory 220 and/or one or more external databases not shown in FIG. 2). The processor(s) 218 may utilize the memory 220 to store programs in code and/or to store data for performing aspects in accordance with the disclosure. The memory 220 may be a non-transitory computer-readable memory storing a drone operation program code. The memory 220 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In some aspects, the automotive computer 206 may be disposed in communication with one or more server(s) 222 and the mobile device 214. The server(s) 222 may be part of a cloud-based computing infrastructure and may be associated with and/or include a Telematics Service Delivery Network (SDN) that provides digital data services to the vehicle 202 and other vehicles (not shown in FIG. 2) that may be part of a vehicle fleet.

In accordance with some aspects, the VCU 208 may share a power bus with the automotive computer 206, and may be configured and/or programmed to coordinate the data between vehicle 202 systems, connected servers (e.g., the server(s) 222), and other vehicles (not shown in FIG. 2) operating as part of a vehicle fleet. The VCU 208 can include or communicate with any combination of the ECUs 212, such as, for example, a Body Control Module (BCM) 224, an Engine Control Module (ECM) 226, a Transmission Control Module (TCM) 228, a telematics control unit (TCU) 230, a Driver Assistances Technologies (DAT) controller 232, etc. The VCU 208 may further include and/or communicate with a Vehicle Perception System (VPS) 234, having connectivity with and/or control of one or more vehicle sensory system(s) 236. In some aspects, the VCU 208 may control the vehicle operational aspects and implement one or more instruction sets received from an application (e.g., a drone control application) operating on the mobile device 214, from one or more instruction sets stored in the memory 220, and/or instruction sets stored in the drone unit 210.

The TCU 230 can be configured and/or programmed to provide vehicle connectivity to wireless computing systems onboard and off board the vehicle 202, and may include a Navigation (NAV) receiver 238 for receiving and processing a GPS signal, a BLE® Module (BLEM) 240, a Wi-Fi transceiver, a UWB transceiver, and/or other wireless transceivers (not shown in FIG. 2) that may be configurable for wireless communication between the vehicle 202 and other systems, computers, and modules. The TCU 230 may be disposed in communication with the ECUs 212 by way of a bus.

In some aspects, the ECUs 212 may control aspects of vehicle operation and communication using inputs from human drivers, inputs from an autonomous vehicle controller, the drone unit 210, and/or via wireless signal inputs received via the wireless connection(s) from other connected devices, such as the mobile device 214, the server(s) 222, among others.

The BCM 224 generally includes integration of sensors, vehicle performance indicators, and variable reactors associated with vehicle systems, and may include processor-based power distribution circuitry that can control functions associated with the vehicle body such as lights, windows, security, camera(s), audio system(s), speakers, display system, door locks and access control, vehicle energy management, and various comfort controls. The BCM 224 may also operate as a gateway for bus and network interfaces to interact with remote ECUs (not shown in FIG. 2).

In some aspects, the DAT controller 232 may provide Level-1 through Level-3 automated driving and driver assistance functionality that can include, for example, active parking assistance, trailer backup assistance, adaptive cruise control, lane keeping, and/or driver status monitoring, among other features. The DAT controller 232 may also provide aspects of user and environmental inputs usable for user authentication.

The DAT controller 232 can further obtain input information via the sensory system(s) 236, which may include sensors disposed on the vehicle interior and/or exterior (sensors not shown in FIG. 2). The DAT controller 232 may receive the sensor information associated with driver functions, vehicle functions, environmental inputs, and other information.

In some aspects, the automotive computer 206 may connect with an infotainment system 242 that may include a touchscreen interface portion, and may include voice recognition features, biometric identification capabilities that can identify users based on facial recognition, voice recognition, fingerprint identification, or other biological identification means. In other aspects, the infotainment system 242 may provide user identification using mobile device pairing techniques (e.g., connecting with the mobile device 214, a Personal Identification Number (PIN)) code, a password, passphrase, or other identifying means.

The computing system architecture of the automotive computer 206, the VCU 208, and/or the drone unit 210 may omit certain computing modules. It should be readily understood that the computing environment depicted in FIG. 2 is an example of a possible implementation according to the present disclosure, and thus, it should not be considered limiting or exclusive.

In accordance with some aspects, the drone unit 210 may be executed as part of and/or integrated with the ECUs 212. The drone unit 210, regardless of whether it is integrated with the automotive computer 206 or the ECUs 212, or whether it operates as an independent computing system in the vehicle 202, may include a vehicle transceiver 244, a vehicle processor 246, and a vehicle computer-readable memory 248, which may be communicatively coupled to each other. The vehicle memory 248 may include a vehicle data database (VDD) 250, a user input database (UID) 252 and a drone database (DD) 254, which may be communicatively coupled with each other.

In some aspects, the vehicle processor 246 may be configured to obtain vehicle data from the VCU 208 (specifically, from the TCU 230). The vehicle data may include, for example, vehicle GPS position and Dilution of Precision (DoP) information, vehicle speed and heading, vehicle transmission status (e.g., vehicle gear status/PRNDL—P for park, R for reverse, N for neutral, D for drive, and L for low mode), vehicle gas pedal and brake pedal positions, a steering wheel angle, vehicle identification (VIN) related attributes such as vehicle color, trim, wheel base, etc.

In some aspects, the vehicle processor 246 may be configured to store the obtained vehicle data in the vehicle memory 248. In particular, the vehicle processor 246 may store the vehicle data in the vehicle data database (VDD) 250.

The vehicle processor 246 may be further configured to obtain user input(s) from the infotainment system 242 and/or the mobile device 214 (e.g., via the drone control application installed in the mobile device 214). As described in FIG. 1, the user inputs may be associated with user's preferences and instructions for drone flight in vehicle proximity. In some aspects, the vehicle processor 246 may obtain the user inputs from the automotive computer 206, which in turn may receive the user inputs from the mobile device 214 and/or the infotainment system 242.

The vehicle processor 246 may be configured to store the obtained user inputs in the vehicle memory 248. In particular, the vehicle processor 246 may store the user inputs in the user inputs database (UID) 252.

In some aspects, responsive to obtaining the vehicle data and the user inputs, the vehicle processor 246 may transmit, via the vehicle transceiver 244, the vehicle data and the user inputs to the drone 204. In some aspects, the vehicle transceiver 244 may transmit the vehicle data and the user inputs via a datalink (not shown) that may be configured to exchange data between the vehicle 202 and the drone 204. In other aspects, the datalink may receive the vehicle data directly from the VCU 208 (such as via an onboard diagnostic II (OBDII) port or a Wi-Fi router) and may transmit the vehicle data to the drone 204.

The drone 204 may include a plurality of components including, but not limited to, a drone transceiver 256, a drone processor 258 and a drone memory 260, which may be communicatively coupled to each other.

The drone memory 260 may store programs in code and/or store data for performing various drone operations in accordance with the present disclosure. Specifically, the drone processor 258 may be configured and/or programmed to execute computer-executable instructions stored in the drone memory 260 for performing various drone functions in accordance with the present disclosure. Consequently, the drone memory 260 may be used for storing code and/or data code and/or data for performing operations in accordance with the present disclosure.

In some aspects, the drone processor 258 may be disposed in communication with one or more memory devices (e.g., the drone memory 260 and/or one or more external databases (not shown in FIG. 2)). The drone memory 260 may be similar to the memory 220 or the vehicle memory 248.

In accordance with some aspects, the drone memory 260 may store a plurality of information/dataset in one or more databases. Examples of such databases include, but are not limited to, a vehicle database 262, a user database 264 and a drone database 266.

In some aspects, the drone transceiver 256 may be configured to receive the vehicle data, the user inputs, and other information from the vehicle 202 (e.g., from the vehicle processor 246, datalink, etc.). The drone transceiver 256 may be configured to store the received data in the drone memory 260. For example, the drone transceiver 256 may store the vehicle data (such as the vehicle transmission status, steering angle status, gas pedal and pedal positions, etc.) in the vehicle database 262. Similarly, the drone transceiver 256 may store the user inputs (including user instructions/feedback/preferences for drone flight, etc.) in the user database 264.

Further, the drone database 266 may be configured to store the vehicle images/videos that the drone 204 may capture via the in-built camera. In some aspects, the drone transceiver 256 may be configured to transmit data (such as the captured vehicle images/videos) from the drone database 266 to the vehicle 202 (specifically, to the vehicle transceiver 244) or to the mobile device 214. In some aspects, the drone transceiver 256 may transmit the captured images/video to the vehicle 202 via the datalink, as described above.

In accordance with further aspects, the drone processor 258 may be configured to obtain the vehicle data and the user inputs from the drone memory 260 or directly from the drone transceiver 256, and process the obtained data/inputs. Specifically, responsive to obtaining the vehicle data, the drone processor 258 may be configured to predict vehicle movement. In further aspects, the drone processor 258 may predict the vehicle movement based on a combination of the vehicle data and the user inputs. Responsive to predicting the vehicle movement, the drone processor 258 may be configured to control the drone movement. The detailed process of coordinating vehicle and drone movements may be understood as follows.

As described in conjunction with FIG. 1, the drone 204 may be placed or housed in a vehicle housing when the drone 204 is not in operation. The vehicle user may transmit a launch request (e.g., a user input) for drone launch via the mobile device 214 or the infotainment system 242 to the vehicle transceiver 244, when the user wants to launch the drone 204. In some aspects, the user may launch the drone 204 to capture the vehicle images/videos while the vehicle 202 is in motion. As described above, the vehicle user may additionally provide other user inputs/instructions (e.g., user preferences) associated with the drone flight, along with the launch request. In some aspects, the vehicle transceiver 244 may send the received launch request and user inputs to the vehicle processor 246 for processing and to the UID 252 for storage purpose.

As described in FIG. 1, responsive receiving the launch request, the vehicle processor 246 may determine whether drone launch conditions are met. In particular, the vehicle processor 246 may obtain the vehicle's GPS location from the NAV 238 and location of UAV/drone flight restricted areas (i.e., location of areas where drone flight is restricted) from the vehicle memory 248. In some aspects, the vehicle memory 248 may be configured to receive UAV/drone flight restricted area locations from the server 222. The vehicle processor 246 may be configured to compare the vehicle's GPS location with the drone flight restricted area locations, and determine whether the vehicle 202 is in a drone flight restricted area. The vehicle processor 246 may enable the drone launch when the vehicle processor 246 determines that the vehicle 202 is not in a drone flight restricted area. Alternatively, the vehicle processor 246 may restrict the drone launch when the vehicle processor 246 determines that the vehicle 202 is in a drone flight restricted area. In further aspects, the vehicle processor 246 may determine vehicle transmission status (i.e., whether the vehicle 202 is stationary or in motion). The vehicle processor 246 may enable the drone launch when the vehicle processor 246 determines that the vehicle 202 is stationary. Alternatively, the vehicle processor 246 may restrict the drone launch when the vehicle processor 246 determines that the vehicle 202 is in motion.

In some aspects, the vehicle processor 246 may transmit (via the vehicle transceiver 244) a launch command to the drone transceiver 256, when the vehicle processor 246 determines that the vehicle 202 is not in the drone flight restricted area and the vehicle 202 is stationary. Response to receiving the launch command, the drone transceiver 256 may send the launch command to the drone processor 258, which may launch the drone 204 on receipt of the launch command.

In further aspects, the vehicle processor 246 may obtain the user inputs (e.g., user instructions/preferences associated with the drone flight) from the vehicle transceiver 244 or the UID 252, when the vehicle processor 246 transmits the launch command to the drone transceiver 256 or when the drone 204 is in operation (e.g., when the drone 204 is in aerial operation). The vehicle processor 246 may transmit, via the vehicle transceiver 244, the user inputs to the drone transceiver 256. For example, the user inputs may include instructions (e.g., UAV follow instructions) for the drone 204 to follow the vehicle 202 from vehicle's left rear side and capture vehicle images/videos.

Responsive to receiving the user inputs, the drone transceiver 256 may send the user inputs to the drone processor 258, which may maneuver drone movement such that the drone 204 may be positioned in proximity to the vehicle's left rear side. Further, the drone processor 258 may activate the drone camera that may capture the vehicle images/videos based on the user inputs. Further, the drone processor 258 may store the captured vehicle images/videos in the drone database 266. In further aspects, the drone transceiver 256 may transmit the vehicle images/videos to the vehicle transceiver 244. The vehicle transceiver 244 may receive the vehicle images/videos and store the images/videos in the vehicle memory 248 (specifically, in the drone database (DD) 254). The vehicle transceiver 244 may be further configured to transmit some or all the captured vehicle images/videos to the mobile device 214, the infotainment system 242 and/or the server 222 via the network 216.

In further aspects, the vehicle processor 246 may obtain the vehicle data from the VCU 208 during the drone operation, e.g., when the drone 104 is in the air and following the vehicle 202. In some aspects, the vehicle processor 246 may regularly or periodically obtain the vehicle data from the VCU 208. Responsive to obtaining the vehicle data, the vehicle processor 246 may transmit, via the vehicle transceiver 244, the vehicle data to the drone transceiver 256. The drone transceiver 256 may further transmit the vehicle data to the drone processor 258.

Responsive to receiving the vehicle data, the drone processor 258 may be configured to predict the vehicle movement based on the vehicle data and accordingly maneuver the drone movement. For example, the drone processor 258 may predict whether the vehicle 202 may turn left/right, increase/decrease speed, move in forward/reverse direction, etc. based on the received vehicle data, and accordingly move the drone 204. For example, the drone processor 258 may move the drone 204 away from the vehicle movement, when the drone processor 258 predicts that the vehicle 202 may move in a reverse direction and when the drone 204 is in proximity to the vehicle's rear side. In this case, the drone processor 258 may additionally transmit a notification (e.g., an alert) to the vehicle user, informing the vehicle user that the drone 204 is in the proximity to the vehicle's rear side. In some aspects, the drone processor 258 may transmit the notification to the vehicle user via the drone transceiver 256, which in turn may transmit the notification to the vehicle transceiver 244. The vehicle transceiver 244 may then transmit the notification to the infotainment system 242 or the mobile device 214 (via the drone control application installed on the mobile device 214), which may enable the vehicle user to view the notification. In some aspects, the notification may be a visual notification, an audio notification or a combination thereof. The vehicle and drone movement coordination may be understood in view of the examples described below, in conjunction with FIG. 3.

Figure 3:
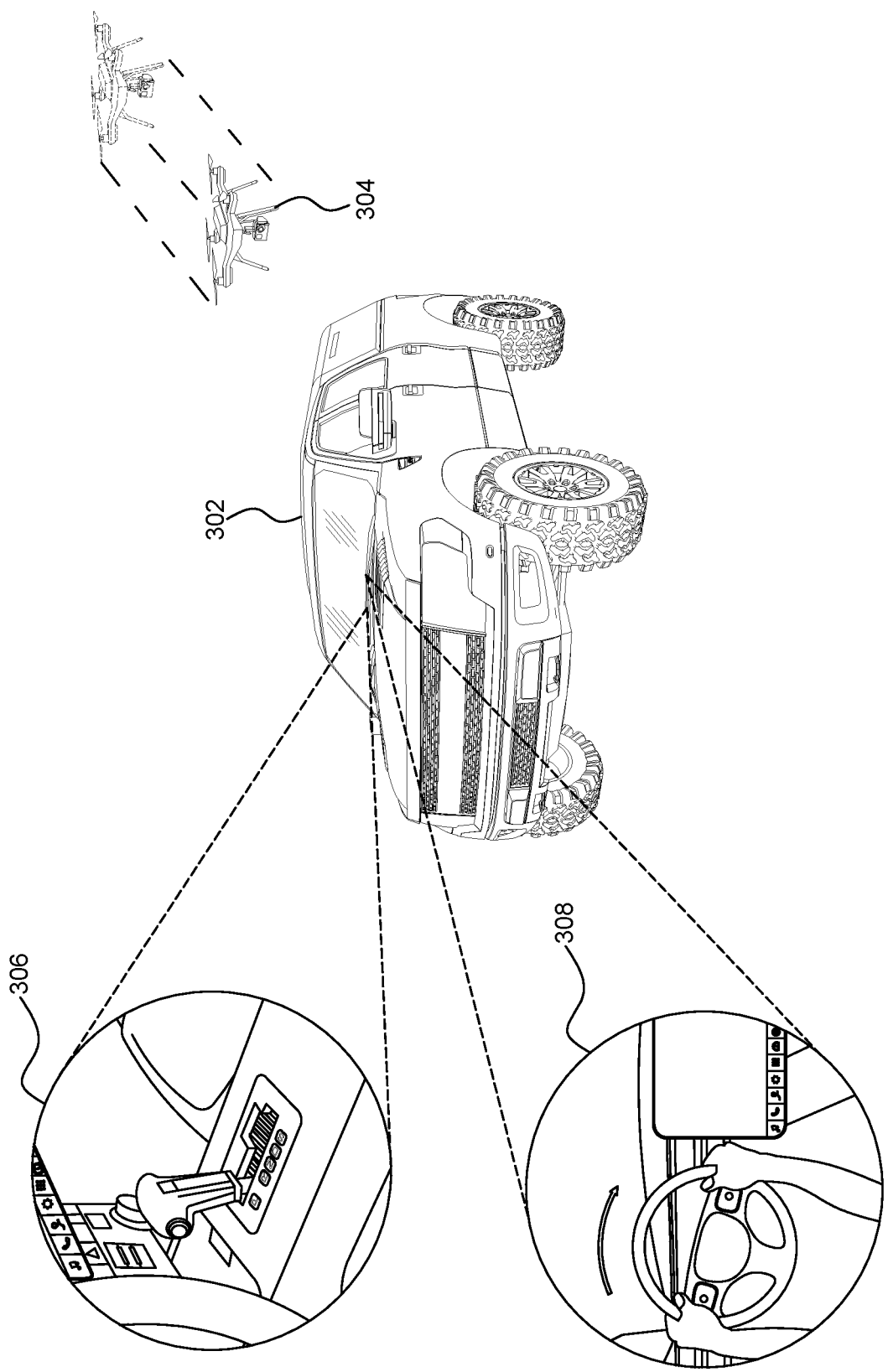
FIG. 3 depicts an example embodiment of coordination between vehicle and drone movements in accordance with the present disclosure.

FIG. 3 depicts an example embodiment of coordination between vehicle and drone movements, in accordance with the present disclosure. FIG. 3 depicts a vehicle 302 and a drone 304 that may be same as the vehicle 202 and the drone 204, respectively. In some aspects, the vehicle processor 246 may obtain vehicle transmission status (shown as a view 306 in FIG. 3) from the VCU 208. The vehicle transmission status may be vehicle gear status/PRNDL status (where P stands for park, R stands for reverse, N stands for neutral, D stands for drive, and L stands for low mode). As an example, the vehicle processor 246 may obtain a gear change information as "reverse", when the vehicle user changes the gear to "R". Responsive to obtaining the gear change information, the vehicle processor 246 may transmit, via the vehicle transceiver 244 and the datalink, the gear change information to the drone transceiver 256.

Responsive to receiving the gear change information, the drone transceiver 256 may transmit the information to the drone processor 258. The drone processor 258 may predict the vehicle movement based on the received gear change information. For instance, the drone processor 258 may predict that the vehicle 302 may move backwards, when the drone processor 258 obtains the information that the vehicle user has changed the gear status to reverse. Responsive to predicting the vehicle movement, the drone processor 258 may cause the drone 304 to move backwards/away from the vehicle 302, if the drone 304 is near to a vehicle rear side (as shown in FIG. 3). In other aspects, the drone processor 258 may transmit (via the infotainment system 242 or the mobile device 214) a notification to the vehicle user. In an exemplary embodiment, the notification may indicate to the user to pause executing the vehicle reverse operation, till the drone 304 moves backward/away from the vehicle path. Alternatively, when the vehicle 302 is an autonomous vehicle, the drone 304 may provide instructions to the vehicle 302 to pause the vehicle reverse operation, till the drone 304 moves backward/away.

In another example, the vehicle processor 246 may obtain a steering wheel angle movement information from the VCU 208, shown as a view 308 in FIG. 3. The steering wheel angle movement information may include information indicating vehicle user's steering wheel movement in a clockwise or an anticlockwise direction. The steering wheel angle movement information may further include information of an angle at which the vehicle user may have moved the steering wheel. Responsive to obtaining the steering wheel angle movement information, the vehicle processor 246 may transmit, via the vehicle transceiver 244 and the datalink, the steering wheel angle movement information to the drone transceiver 256.

Responsive to receiving the steering wheel angle movement information, the drone transceiver 256 may transmit the information to the drone processor 258. The drone processor 258 may predict the vehicle movement based on the received steering wheel angle movement information, and accordingly maneuver the drone movement. For example, the drone processor 258 may move the drone 304 left or right, based on whether the vehicle user has moved the steering wheel in anticlockwise or clockwise direction.

In further aspects, the drone transceiver 256 may obtain the user inputs (instructions/preferences) from the vehicle processor 246, along with the vehicle data (e.g., the vehicle transmission status or the steering wheel angle movement information) described above. As an example, the drone transceiver 256 may receive user instructions to capture the vehicle images/videos from a vehicle's right side, in addition to receiving the steering angle movement information. The drone transceiver 256 may send the user instructions and the steering angle movement information to the drone processor 258, which may maneuver the drone movement based on the received user instructions and information. For example, the drone processor 258 may predict that the vehicle 302 may move towards right direction, when the drone processor 258 obtains the information that the vehicle user has moved the steering wheel clockwise. Responsive to predicting the vehicle movement towards the right, the drone processor 258 may combine the vehicle movement prediction and the user instructions to capture the vehicle images/videos from the vehicle's right side and maneuver the drone movement accordingly.

In yet another example, the vehicle processor 246 may obtain vehicle gas pedal and brake pedal position information (not shown in FIG. 3) from the VCU 208. The vehicle gas pedal and brake pedal position information may include information indicating whether the vehicle user has pressed the vehicle gas pedal or the brake pedal, or whether there is a change in the vehicle gas pedal or the brake pedal position. As an example, the drone processor 258 may obtain information indicating whether the vehicle user has pressed the vehicle gas pedal or the brake pedal with a force or in a soft manner. A person ordinarily skilled in the art may appreciate that the vehicle gas pedal or the brake pedal position may change automatically when the vehicle 302 is an autonomous vehicle.

Responsive to obtaining the vehicle gas pedal and brake pedal position information, the vehicle processor 246 may transmit, via the vehicle transceiver 244 and the datalink, the information to the drone processor 258. The drone processor 258 may compare the received vehicle gas pedal or the brake pedal positions with pre-stored vehicle gas pedal or brake pedal positions (that may be stored in the vehicle memory 248 or the drone memory 260). Responsive to the comparison, the drone processor 258 may predict the increase or decrease in vehicle speed. In addition, the drone processor 258 may obtain the user inputs from the vehicle transceiver 244. Responsive to predicting vehicle speed and obtaining the user inputs, the drone processor 258 may maneuver the drone movement accordingly.

In further aspects, the vehicle processor 246 may obtain vehicle identification (VIN) related vehicle attributes (that may be pre-stored in the memory 220). The vehicle attributes may include, but are not limited to, vehicle color, trim, wheelbase, etc. The vehicle processor 246 may transmit, via the vehicle transceiver 244 and the datalink, the vehicle attributes to the drone transceiver 256. The drone transceiver 256 may transmit the vehicle attributes to the drone processor 258. The drone processor 258 may receive the vehicle attributes and perform image processing using Binary Large Object (Blob) detection. In particular, the drone processor 258 may use the Blob detection method to follow the vehicle 202 based on the vehicle attributes, while the drone 304 is in aerial operation.

In additional aspects, the vehicle processor 246 may obtain a vehicle window status information from the VCU 208. The vehicle window status information may include information associated with a vehicle window open/closed status, e.g., a vehicle sunroof status. The sunroof may be located near the housing in which the drone-landing pad (as described in FIG. 1) may be placed. In an exemplary aspect, the vehicle processor 246 may open the sunroof when the vehicle processor 246 sends the launch command to the drone 304, which may enable the drone 304 to move out of the housing. The vehicle processor 246 may close the sunroof when the drone 304 moves out. Further, the vehicle processor 246 may open the sunroof again during drone landing operation.

In some aspects, the vehicle processor 246 may transmit, via the vehicle transceiver 244 and the datalink, the vehicle window status information to the drone transceiver 256. The drone transceiver 256 may transmit the vehicle window status information to the drone processor 258. Responsive to receiving the vehicle window status information, the drone processor 258 may determine whether the vehicle user may want the drone 304 to come back to the vehicle 302. For example, when the vehicle user opens the window/sunroof and the drone 304 is outside the vehicle 302, the drone 304 may come back to the vehicle 302 and land in the landing pad. In further aspects, the drone processor 258 may obtain the vehicle's transmission status, such as "Parking" or "Neutral", and may determine whether the window/sunroof is open or closed (based on the window status information). The drone 304 may return to the vehicle 302 and land, when the drone processor 258 determines that the vehicle's transmission status is "Parking" or "Neutral" and the window/sunroof is open. In additional aspects, the drone 304 may return to the vehicle 302 and land, based on a user's request to return (e.g., a UAV retract instruction). In this case, the user may transmit the request to the drone 304 to return to the vehicle 302, via the infotainment system 242 or the mobile device 214.

Figure 4:
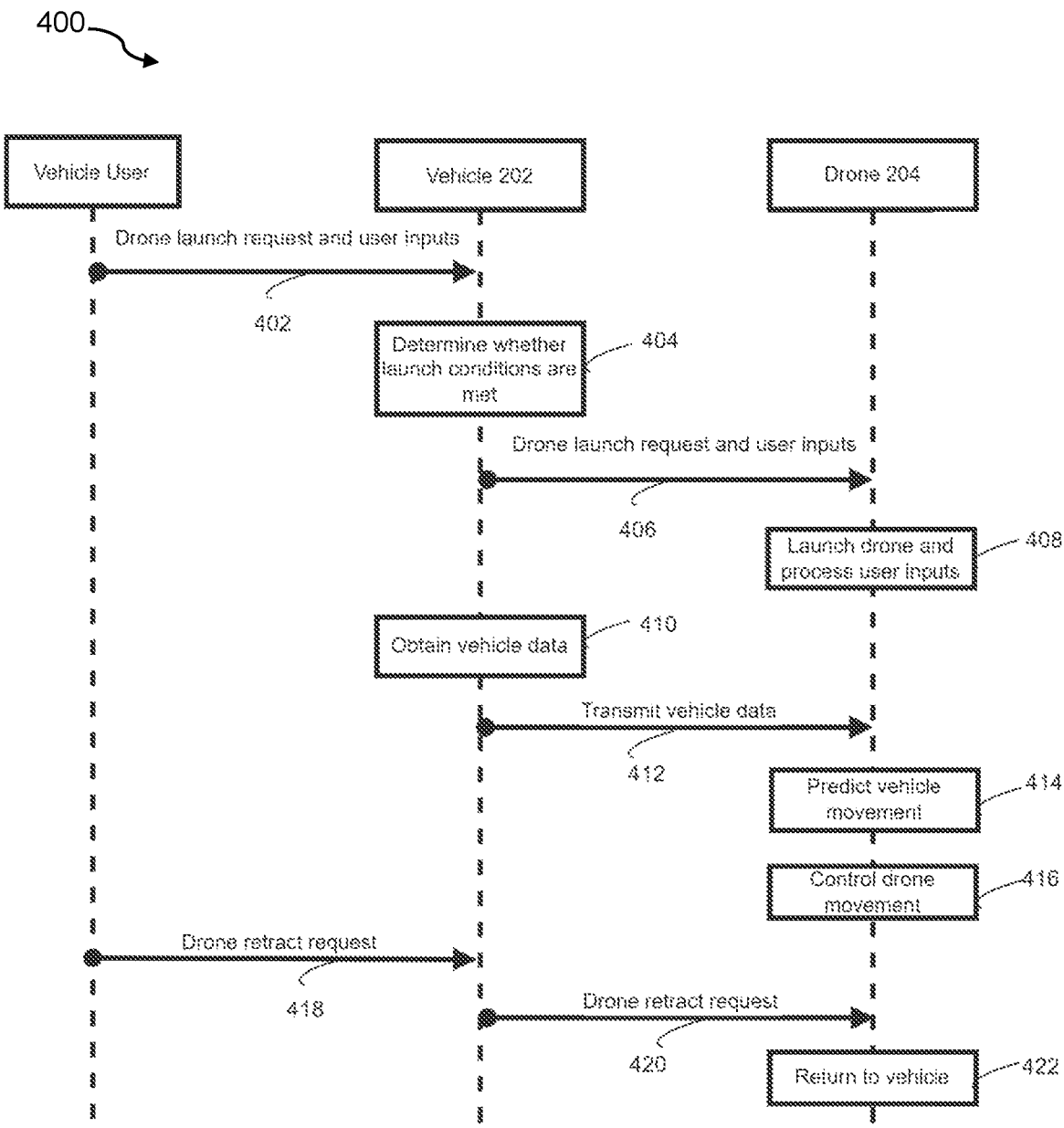
FIG. 4 depicts a sequential diagram for coordinating vehicle and drone movements in accordance with the present disclosure.

FIG. 4 depicts a sequential diagram 400 for coordinating vehicle and drone movements, in accordance with the present disclosure. Specifically, FIG. 4 depicts a series of events and the corresponding series of signal transfers between the vehicle user, the vehicle 202 and the drone 204.

As shown in the sequential diagram 400, the vehicle user may transmit a drone launch request and user inputs (e.g., UAV launch instruction) to the vehicle 202 at step 402. At step 404, the vehicle 202 may determine whether drone launch conditions are met, when the vehicle 202 receives the drone launch request, as discussed above in conjunction with FIGS. 1 and 2. Specifically, the vehicle 202 may determine whether the vehicle 202 is stationary and not in the UAV flight restricted area. Responsive to a determination that the launch conditions are met, the vehicle 202 may transmit the drone launch request (or a drone launch command) to the drone 204 at step 406. In other aspects, when the launch conditions are not met, the vehicle 202 may provide notification to the vehicle user and indicate that the launch conditions are not met.

Along with the drone launch request, the vehicle 202 may also transmit the user inputs to the drone 204 at step 406. The user inputs may include UAV follow instructions (e.g., follow the vehicle 202 and capture the vehicle images/videos from specific views with respect to the vehicle 202), as described above. At step 408, the drone 204 may process the drone launch request and the user inputs. In other words, the drone 204 may receive the drone launch request and move out of the vehicle housing (i.e., launch the drone 204). Further, the drone 204 may follow the vehicle 202 and capture the vehicle images/videos based on the user inputs.

In some aspects, the vehicle 202 may obtain vehicle data from the VCU 208 (e.g., from the TCU 230) at step 410. The vehicle data details are described above in conjunction with FIGS. 1-3. At step 412, the vehicle 202 may transmit the vehicle data to the drone 204. In some aspects, the vehicle 202 may also transmit additional user inputs (if any) to the drone 204 at step 412 (i.e., during drone flight). At step 414, the drone 204 may predict the vehicle movement based on the vehicle data. The details associated with vehicle movement prediction are described above in conjunction with FIGS. 1-3. At step 416, the drone 204 may control the drone movement based on the vehicle movement prediction and the user inputs, as discussed above.

In further aspects, the vehicle user may transmit drone retract request (e.g., UAV retract instruction) to the vehicle 202 at step 418. At step 420, the vehicle 202 may transmit the drone retract request to the drone 204. Responsive to receiving the drone retract request, the drone 204 may return to the vehicle 202 (e.g., land in the housing described in FIGS. 1 and 2), at step 422.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle integrated unmanned aerial system comprising:
   a vehicle comprising:
      a vehicle control unit configured to measure a vehicle telemetry information;
      a vehicle processor;
      a vehicle memory operably coupled to the vehicle processor and storing instructions for execution on the vehicle processor, the instructions causing the vehicle processor to:
         obtain information about a gear change status of the vehicle from the vehicle control unit;
         and
      a vehicle transmitter communicably coupled to the vehicle processor and configured to transmit the information about the gear change status of the vehicle; and
   an unmanned aerial vehicle (UAV) comprising:
      a UAV receiver configured to receive the information about the gear change status of the vehicle from the vehicle transmitter;
      a UAV processor configured to:
         determine, based on the information about the gear change status of the vehicle that the vehicle is predicted to move in backward direction from its current position;
         send, to the vehicle processor, an instruction to pause the vehicle motion in the backward direction until the UAV has moved away from the backward direction of the motion of the vehicle; and
         cause the vehicle processor to stop vehicle motion in the backward direction.

2. The vehicle integrated unmanned aerial system of claim 1, wherein the vehicle processor further receives a Global Positioning System (GPS) position, a Dilution Of Precision (DOP) information, a vehicle speed and a vehicle heading.

3. The vehicle integrated unmanned aerial system of claim 1, wherein the vehicle processor further receives vehicle gas pedal and brake pedal positions.

4. The vehicle integrated unmanned aerial system of claim 1, wherein the vehicle processor further receives a vehicle steering wheel angle information.

5. The vehicle integrated unmanned aerial system of claim 1, wherein the UAV is further configured to receive user input, wherein the user input comprises at least one of: a UAV launch instruction, a UAV follow instruction and a UAV retract instruction.

6. The vehicle integrated unmanned aerial system of claim 5, wherein the vehicle processor obtains the user input via a vehicle user device or a vehicle infotainment system.

7. The vehicle integrated unmanned aerial system of claim 6, wherein the UAV further comprises:
 a UAV camera configured to capture a plurality of vehicle images based on the user input; and
 a UAV transmitter configured to transmit the plurality of vehicle images to the vehicle or the vehicle user device.

8. The vehicle integrated unmanned aerial system of claim 7, wherein the vehicle further comprises a vehicle receiver configured to receive the plurality of vehicle images, and wherein the vehicle memory is further configured to store the plurality of vehicle images.

9. A method for coordinating movements of a vehicle and an unmanned aerial vehicle (UAV) comprising:
 obtaining, by a vehicle processor, information about a gear change status of the vehicle from a vehicle control unit, wherein the information about the gear change status is indicative of the vehicle moving in a forward or a backward direction;
 transmitting, by a vehicle transmitter, the information about the gear change status to the UAV;
 determining, by the UAV based on the information about the gear change status of the, vehicle, that the vehicle is predicted to move in the backward direction from its current position;
 sending, by the UAV to the vehicle processor, an instruction to pause motion of the vehicle in the backward direction until the UAV has moved away from a path of the vehicle; and
 causing, by the UAV, the vehicle processor to pause the motion of the vehicle in the backward direction.

10. The method of claim 9, wherein the vehicle processor further receives a Global Positioning System (GPS) position, a Dilution Of Precision (DOP) information, a vehicle speed and a vehicle heading.

11. The method of claim 9, wherein the vehicle processor further receives vehicle gas pedal and brake pedal positions.

12. The method of claim 9, wherein the vehicle processor further receives a vehicle steering wheel angle.

13. The method of claim 9, further comprising receiving, by the vehicle processor, a user input, wherein the user input comprises at least one of: a UAV launch instruction, a UAV follow instruction and a UAV retract instruction.

14. A non-transitory computer-readable medium storing computer-executable instructions which when executed by one or more processors result in performing operations comprising:
 obtaining, by a vehicle processor, information about a gear change status of the vehicle, from a vehicle control unit;
 transmitting, by a vehicle transmitter, the information about the gear change status of the vehicle to an unmanned aerial vehicle (UAV);
 determining, by the UAV processor and based on the information about the gear change status of the vehicle, that the vehicle is predicted to move in backward direction from its current position;
 sending, by the UAV processor to the vehicle processor, an instruction to stop the movement of the vehicle in the backward direction until the UAV has moved away from a path of the vehicle; and
 pausing, by the vehicle processor and based on receiving the instruction from the UAV processor, a motion of the vehicle in the backward direction.

15. The non-transitory computer-readable medium of claim 14, wherein the vehicle processor further receives vehicle gas pedal and brake pedal positions.

16. The non-transitory computer-readable medium of claim 14, wherein the vehicle processor further receives a vehicle steering wheel angle.

* * * * *